(No Model.)
W. W. HUME.
MEDAL.
No. 476,538.   Patented June 7, 1892.
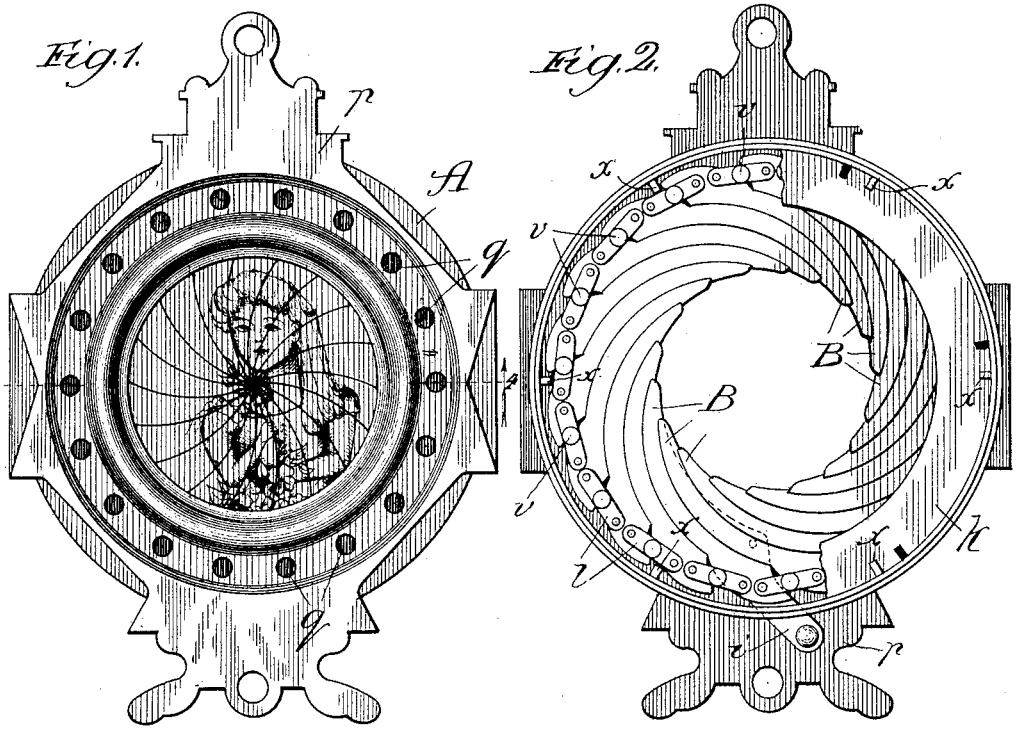
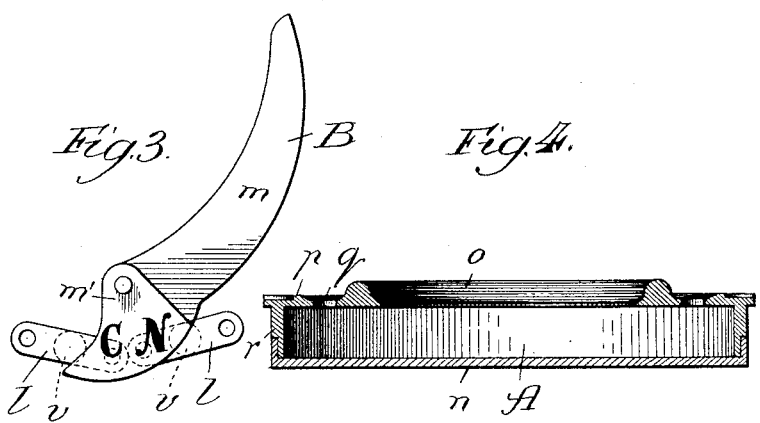
Witnesses:
Chas. E. Gaylord
Clifford N. White
Inventor:
William Wallace Hume,
By Dyrenforth & Dyrenforth,
Attys

UNITED STATES PATENT OFFICE.

WILLIAM WALLACE HUME, OF CHICAGO, ILLINOIS.

MEDAL.

SPECIFICATION forming part of Letters Patent No. 476,538, dated June 7, 1892.

Application filed April 18, 1892. Serial No. 429,648. (No model.)

*To all whom it may concern:*

Be it known that I, WILLIAM WALLACE HUME, a citizen of the United States, residing at Chicago, in the county of Cook and State of Illinois, have invented a new and useful Improvement in Medals, of which the following is a specification.

The object of my invention is to provide a medal the leading feature of which shall be a diaphragm having painted or otherwise formed upon it a figure or any desired design or configuration and the construction of which shall be such as to adapt the diaphragm to be opened outward from its center, thereby expanding the latter into a more or less perfect circle and causing the view, figure, or the like upon it to disappear, as by dissolving, the reappearance of the representation on the diaphragm being produced by gradually narrowing the circle till it is closed or partially closed.

The details of construction involved in my invention are shown in the accompanying drawings, in which—

Figure 1 shows my improved medal in front elevation with the diaphragm closed. Fig. 2 is a rear broken view of the same open with the back plate or cover removed. Fig. 3 shows by an enlarged representation one of the tapering concavo-convex folding leaves of which the diaphragm is formed and the links whereby it is connected with the leaves which flank it in the diaphragm. Fig. 4 is a cross-sectional view of the case.

Generally stated, my improved medal involves a case open or adapted to be opened on its face, the form of the opening being by preference circular, and a series of mutually-overlapping leaves which should be uniform or approximately uniform in size and shape, each being curved and tapering toward one end and all being pivoted on the same circle or approximate circle near their wider ends and linked together near their pivotal points each with the other, whereby turning one on its pivot will simultaneously turn all on their pivots and, depending on the direction of turning, separate them in a circle or approximate circle from their tapering extremities from a point to or toward which they all converge or bringing the tapering ends toward or to such point by gradually narrowing the circle. On the diaphragm formed by the pivotal leaves or behind it, as on the case, or on each or otherwise, I provide a picture, configuration, or the like which is disclosed by turning the leaves of the diaphragm in either of the two directions and concealed by turning them in the opposite direction. The case should also have around its face a circular series of openings over the expanded bases or larger flat end portions of the leaves, on which may be provided letters or any different characters adapted to be displayed through the openings and to form a motto or other significant or attractive matter.

For the purposes of a medal in particular I prefer that the pictorial or other representation shall be provided directly on the surface of the diaphragm, (without, however, of course being of a nature to interfere with the separation of the leaves,) whereby the effect of separating the leaves will be to dissipate the view and that of converging them will be to associate the parts forming the view, and I therefore confine the detailed description of the construction hereinafter contained mainly to that particular form of my improvement and also so represent it in the accompanying drawings.

A is a case, which may be of any desired form and size and of any suitable material, thus, for a medal of metal, celluloid, hard rubber, and the like. As shown in Fig. 4, though I do not limit the construction thereto, the case is formed with a ring $r$, provided on the front side for the medal with a plate $p$ of ornamental design, having a circular opening (which may be covered with glass) about its center, and on the back of the ring is a cap $n$, which, though shown as closed, may have an opening in it.

B B are the leaves, the preferred form of which is represented by the leaf illustrated in Fig. 3. It involves a thin flat laterally concavo-convex finger portion $m$, tapering along its edges toward one end from a laterally-expanded and somewhat-thickened head $m'$. Between the extremities of their head portions $m'$ the leaves are all pivoted to extend in the same direction and preferably to overlap each other on a circle or approximate circle on the rear side of the face-plate $p$ about the opening $o$ therein, and each is connected with the other by a link *l*. The preferred manner of producing the link connection is that illustrated of causing each link to connect two adjacent leaves together from beyond the circle on which they are pivoted and at its opposite ends, of course, from corresponding sides of the respective pivots. Thus each leaf B has pivoted to it, as shown in Fig. 3, the adjacent ends of two links *l*, which extend thence in opposite directions to have their other ends pivotally connected, respectively, with leaves flanking it, and in order that the leaves may be confined against possible disarrangement I provide stop-heads *v* to project outward from the centers of the links and abutt against a flat ring *k*, seated against them and confined, as by pins *x*, inside the ring *r*.

For turning the leaves on their pivots any of various means may be provided. I show for the purpose a crank-handle *i*, extending from the head portion *m′* of one leaf through and beyond the ring *r*, where it is concealed behind the face-plate *p* and in conveniently accessible position.

As will readily be seen, by turning the handle *i* toward the left from the position in which it is illustrated in Fig. 2, wherein the diaphragm formed by the leaves B is open, the leaves will be brought together to the relative positions in which they are represented in Fig. 1, wherein they form the closed diaphragm. On the latter is painted a picture, (shown in Fig. 1,) which disappears when the diaphragm is opened in the manner described and reappears when it is again closed.

A pictorial or other representation may, if desired, also be provided on the rear side of the diaphragm when the back of the case should be open; or, if it be closed, a suitable picture or the like may be provided on its inner surface, to be concealed when the diaphragm is closed and displayed when it is open. It is, furthermore, quite feasible to form the leaves of a material—such as sensitized celluloid film—on which a photograph may be taken.

On the faces of the head portions *m′* of the leaves I provide letters, preferably two on each, only one at a time of which, however, can be displayed through an opening *q*. Thus when the diaphragm is open the letters on the heads *m′* thereby brought coincident with the openings *q* may form one motto, word, or phrase and those brought so coincident by closing the diaphragm may form another.

While I have shown and described my improvement as a medal adapted to be worn on the person, I realize that it may be adapted for other purposes, even where requiring to be constructed on a much larger scale, as for pictorial and other advertising, theatrical purposes, (in which the stage might even be the case A,) &c.

What I claim as new, and desire to secure by Letters Patent, is—

1. In combination, a case and a diaphragm formed of leaves pivoted on a circle or approximate circle and interconnected to open and close at their inner ends in such a circle, means for opening and closing the diaphragm, and a suitable design or the like caused to appear or disappear by opening or closing the diaphragm, substantially as described.

2. In combination, a case and a diaphragm formed of leaves pivoted on a circle or approximate circle and interconnected to open and close at their inner ends in such a circle, means for opening and closing the diaphragm, and a suitable design or the like formed on the surface of the diaphragm and caused to disappear and reappear, respectively, by opening and closing the diaphragm, substantially as described.

3. In combination, a case having a circular series of openings about its face and a diaphragm formed of connected leaves provided with characters to coincide with said openings, the leaves being pivoted on a circle or approximate circle to open and close at their inner ends in such a circle, means for opening and closing the diaphragm, and a suitable design or the like caused to appear or disappear by opening or closing the diaphragm, substantially as described.

4. In combination, a case having a circular series of openings about its face and a diaphragm formed of connected leaves provided with characters to coincide with said openings, the leaves being pivoted on a circle or approximate circle to open and close at their inner ends in such a circle, means for opening and closing the diaphragm, and a suitable design or the like formed on the surface of the diaphragm and caused to disappear and reappear, respectively, by opening and closing the diaphragm, substantially as described.

5. A medal comprising, in combination, a case, a diaphragm within the case, formed of leaves B, pivoted on a circle or approximate circle and interconnected by links *l*, means for opening and closing the diaphragm, and a suitable design or the like caused to appear or disappear by opening or closing the diaphragm, substantially as described.

6. A medal comprising, in combination, a case having a circular series of openings *q* about the center of its face-plate, a diaphragm within the case, formed of leaves B, interconnected by links *l*, and provided on their head portions *m′* with characters to coincide with said openings, the leaves being pivoted at their said head portions on a circle or approximate circle, means for opening and closing the diaphragm, and a suitable design or the like caused to appear or disappear by opening or closing the diaphragm, substantially as described.

7. A medal comprising, in combination, a case A, having a circular series of openings *q* about the center of its face-plate, a diaphragm within the case, formed of leaves B, interconnected by links *l*, and provided on their head portions *m′* with characters to coincide with said openings, the leaves being pivoted at their said head portions on a circle or approximate circle, stops $v$, at which the leaves are held in place in the case, a handle $i$, extending from one of the leaves to work the diaphragm, and a suitable design or the like on the surface of the diaphragm and caused to disappear and reappear, respectively, by opening and closing the diaphragm, substantially as described.

WILLIAM WALLACE HUME.

In presence of—
M. J. FROST,
W. N. WILLIAMS.